US007693896B1

(12) United States Patent
Raines

(10) Patent No.: US 7,693,896 B1
(45) Date of Patent: Apr. 6, 2010

(54) APPARATUS AND METHOD FOR PERUSING SELECTED VEHICLES HAVING A CLEAN TITLE HISTORY

(75) Inventor: Richard Raines, Arlington, VA (US)

(73) Assignee: Carfax, Inc., Centerville, VA (US)

( * ) Notice: Subject to any disclaimer, the term of this patent is extended or adjusted under 35 U.S.C. 154(b) by 142 days.

(21) Appl. No.: 11/651,960

(22) Filed: Jan. 11, 2007

Related U.S. Application Data

(63) Continuation of application No. 10/233,952, filed on Sep. 3, 2002, now Pat. No. 7,228,298.

(60) Provisional application No. 60/316,547, filed on Aug. 31, 2001.

(51) Int. Cl.
*G06F 17/30* (2006.01)

(52) U.S. Cl. .................. 707/706; 707/748; 707/758; 707/948

(58) Field of Classification Search .................. 707/104
See application file for complete search history.

(56) References Cited

U.S. PATENT DOCUMENTS

| 4,989,144 | A | * | 1/1991 | Barnett, III | ................ 705/29 |
| 5,127,005 | A | | 6/1992 | Oda et al. | |
| 5,598,511 | A | | 1/1997 | Petrinjak et al. | |
| 5,899,985 | A | | 5/1999 | Tanaka | |
| 6,006,201 | A | * | 12/1999 | Berent et al. | ................ 705/27 |
| 6,052,631 | A | | 4/2000 | Busch et al. | |
| 6,098,061 | A | | 8/2000 | Gotoh et al. | |
| 6,259,354 | B1 | | 7/2001 | Underwood | |
| 6,397,131 | B1 | | 5/2002 | Busch et al. | |
| 6,505,106 | B1 | | 1/2003 | Lawrence et al. | |
| 6,728,685 | B1 | | 4/2004 | Ahluwalia | |
| 6,754,564 | B2 | | 6/2004 | Newport | |
| 2001/0011221 | A1 | | 8/2001 | Underwood | |
| 2001/0053995 | A1 | | 12/2001 | Nishimoto | |
| 2001/0054017 | A1 | | 12/2001 | Wakabayashi et al. | |
| 2002/0024537 | A1 | | 2/2002 | Jones et al. | |
| 2002/0042752 | A1 | | 4/2002 | Chaves | |
| 2002/0065707 | A1 | | 5/2002 | Lancaster et al. | |
| 2002/0082930 | A1 | | 6/2002 | Park | |
| 2002/0082934 | A1 | | 6/2002 | Koda et al. | |
| 2002/0087420 | A1 | | 7/2002 | Higgins et al. | |
| 2002/0087423 | A1 | | 7/2002 | Palango et al. | |
| 2002/0099618 | A1 | | 7/2002 | Stiberman | |
| 2002/0169640 | A1 | | 11/2002 | Freeland | |
| 2002/0194051 | A1 | | 12/2002 | Hall et al. | |
| 2003/0036964 | A1 | | 2/2003 | Boyden et al. | |

OTHER PUBLICATIONS www.kbb.com, "Kelley Blue Book," Advice, New Car Values/Used Car Values, date printed Jul. 12, 2004.
www.kbb.com, "Kelley Blue Book," Condition Quiz—Appraise Your Own Vehicle, 2002 BMW 7 Series 745Li Sedan 4D, date printed Jun. 10, 2003.

(Continued)

*Primary Examiner*—James Trujillo
*Assistant Examiner*—William Spieler
(74) *Attorney, Agent, or Firm*—Marc S. Kaufman; Jennifer Hayes; Nixon Peabody, LLP

(57) ABSTRACT

A system and method for allowing a consumer to search a database containing used vehicles from a variety of sellers that can be queried to provide search results that include only vehicles having clean title histories.

20 Claims, 16 Drawing Sheets

OTHER PUBLICATIONS www.kbb.com, "Kelley Blue Book," Blue Book Trade-In Report, 2002 BMW 7 Series 745Li Sedan 4D, date printed Jun. 10, 2003.
auto.consumerguide.com, "The Truth About Cars," date printed Jun. 10, 2003.
"Powered by Intelliprice," 2001 BMW 7 Series 4D Sedan 740iL, Describe the condition of your vehicle, p. 1 of 1, date printed Jun. 10, 2003.
http://nada.org, "National Automobile Dealers Association Online," Home Page, pp. 1 of 2, date printed Jul. 15, 2004.
www2.nadaguides.com, "Build and Price a New Car," Request a new car quote, p. 1 of 1, date printed Jul. 12, 2004.
www2.nadaguides.com, "Build and Price a New Car," Vehicle Report, pp. 1 of 2, date printed Jul. 12, 2004.
www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.
www.autotrader.com, "Used Cars, Sell Your Car, Auto Financing & Insurance," p. 1 of 1, date printed Jul. 12, 2004.
www.autotrader.com, "Used Cars For Sale: Step 2 of 2," p. 1 of 1, date printed Jul. 12, 2004.
www.autotrader.com, "Used Cars For Sale: Step 2 of 2," p. 1 of 2, date printed Jul. 12, 2004.
www.autotrader.com, "Used Cars For Sale: Car Details," pp. 1 of 2, date printed Jul. 12, 2004.
www.autotrader.com, "Find Your Car: Search Results," pp. 1 of 2, date printed Jul. 12, 2004.
www.cars.com, "Listings and research to connect you with the right car," pp. 1 of 2, date printed Jul. 12, 2004.
www.cars.com, "Search Results," pp. 1 of 2, date printed Jul. 12, 2004.
www.cars.com, "1989 Ford Mustang LX Sport," pp. 1 of 2, date printed Jul. 12, 2004.
www.carmax.com, "The Online Auto Superstore" Home Page, p. 1 of 1, date printed Jul. 12, 2004.
www.carmax.com, "The Online Auto Superstore: Quick Search," p. 1 of 1, date printed Jul. 12, 2004.
www.carmax.com, "The Online Auto Superstore: Search Results," pp. 1 of 2, dated printed Jul. 12, 2004.
www.carmax.com, "The Online Auto Superstore: Clean Title," p. 1 of 1, date printed Jul. 12, 2004.
www.dchusedcars.com, "DCH Auto Group, Used Car CyberLot of New Jersey—Freehold, New Jersey," Inventory, p. 1 of 1, date printed Jul. 15, 2004.
www.dchusedcars.com, "DCH Auto Group, Used Car CyberLot of New Jersey—Freehold, New Jersey," Inventory-results, p. 1 of 1, date printed Jul. 15, 2004.
www.dchusedcars.com, "DCH Auto Group, Used Car CyberLot of New Jersey—Freehold, New Jersey," Certifications, pp. 1 of 3, date printed Jul. 15, 2004.
www.autos.yahoo.com, "New car prices, car pictures, car reviews, used cars, used car prices on Yahoo!," pp. 1 of 3, date printed Jul. 15, 2004.
www.used-cars.autos.yahoo.com, "Fairfax Used Cars BMW—Fairfax VA Used BMW Cars," pp. 1 of 3, date printed Jul. 15, 2004.
www.mbusa.com, "Find Starmark Certified pre owned Mercedes-Benz cars at mbusa.com," p. 1 of 1, date printed Jul. 15, 2004.
www.mbusa.com, Untitled, p. 1 of 1, date printed Jul. 15, 2004.
www.mbusa.com, "Search Results," for 2004 Convertible, pp. 1 of 2, date printed Jul. 15, 2004.
www.stoneage.com, "Building New Roads for the Automotive Community," p. 1 of 1, date printed Jul. 15, 2004.
www.car.com, "Building New Roads for the Automotive Community," pp. 1 of 2, date printed Jul. 15, 2004.
www.car.com, "New Vehicle Quote Process," pp. 1 of 2, date printed Jul. 15, 2004.
www.car.com, "List My Car for Sale—Step 1," p. 1 of 1, date printed Jul. 15, 2004.
www.carsmart.com, "New and Used Car Prices," pp. 1 of 2, date printed Jul. 14, 2004.
www.dealernet.com, "The Key to Your Car, Welcome to Dealernet Prices and Reviews," p. 1 of 1, date printed Jul. 15, 2004.
www.autobytel.com, "Research," pp. 1 of 2, date printed Jul. 15, 2004.
www.carfax.com, "Don't buy a used car without CARFAX!," p. 1 of 1, date printed Nov. 8, 2004.
www.carfax.com, "CARFAX Vehicle History Report," pp. 1-9, date printed Nov. 8, 2004.

* cited by examiner

/—49

Dave's Honda
Fairfax, MO 22030

DO NOT List this Vehicle in Carfax
Certified Cars™. Click here to exclude
NOTE: This graphic will not print

CARFAX
VEHICLE HISTORY REPORTS        www.carfax.com

The Vehicle Identification Number submitted was checked against the Carfax® database of over 1.14 billion vehicle records. The Carfax database includes U.S. and Canadian title and registration activity, rental and lease usage, odometer readings from emissions inspection stations, auto auctions and other sources. The results of this search are displayed below.

1 Vehicle Specifications

| | |
|---|---|
| Vehicle ID: | 1FMDU34X8MUB29340 |
| Yr/Mfg: | 1991 Ford |
| Model: | Explorer |
| Body: | Utility |
| Engine: | 4.0L V6 EFI |
| Fuel: | Gasoline |

FIG. 3

Dave's Honda
Fairfax, MO 22030

CARFAX CERTIFIED CAR™

VEHICLE HISTORY REPORTS www.carfax.com

The Vehicle Identification Number submitted was checked against the Carfax® database of over 1.14 billion vehicle records. The Carfax database includes U.S. and Canadian title and registration activity, rental and lease usage, odometer readings from emissions inspection stations, auto auctions and other sources. The results of this search are displayed below.

Vehicle Specifications

| | |
|---|---|
| Vehicle ID: | 1FMDU34X8MUB29340 |
| Yr/Mfg: | 1991 Ford |
| Model: | Explorer |
| Body: | Utility |
| Engine: | 4.0L V6 EFI |
| Fuel: | Gasoline |

FIG. 4

Carfax Certified Cars Inventory Manager
Carfax Incorporated Columbia, MO
21 guaranteed vehicles in Carfax Certified Cars Inventory; viewed 0 times by consumers searching for quality vehicles!

Use checkboxes to select records to update.

| Select Record | VIN | Stock Number | Consumer Views | Status | Year | Make | Model | Body Type | Color | Dealer Odo Reading | Sold Price | Active Days Left | View History | View GVR | Date Added | Last Modified |
|---|---|---|---|---|---|---|---|---|---|---|---|---|---|---|---|---|
| ☐ | 1GCCC14D5DS111063 | zztop | 0 | Active | 1983 | CHEVROLET | C10 | Pickup | Green | 4500 | 30000 | 53 | GO | GO | 08.30.00 | 09.05.00 |
| ☐ | 2G1WN52M0T1141340 | 12345 | 0 | Active | 1996 | CHEVROLET | LUMINA LS | Sedan 4 DR | Blue-green | | | 52 | GO | GO | 08.30.00 | 09.05.00 |
| ☐ | 3G1JC5242WS852899 | 54321 | 0 | Active | 1998 | CHEVROLET | CAVALIER | Sedan 4 DR | Beige | 1234 | 4000 | 52 | GO | GO | 08.30.00 | 09.05.00 |
| ☐ | 1B7GL22X7YS520045 | A-12345 | 0 | Active | 2000 | DODGE | DAKOTA | Club Cab Pickup | Beige | 67000 | 9870 | 51 | GO | GO | 08.28.00 | 08.30.00 |
| ☐ | 1FABP41A6KF293749 | dksdjta | 0 | Active | 1989 | FORD | MUSTANG LX | Hatchback 2 DR | Burgundy | | | 53 | GO | GO | 08.30.00 | 09.01.00 |
| ☐ | 1FALP4043VF203400 | | 0 | Active | 1997 | FORD | MUSTANG | Coupe | Select | | | 54 | GO | GO | 09.01.00 | 09.01.00 |
| ☐ | 1FTEE1429VHB35043 | | 0 | Active | 1997 | FORD | ECONOLINE E150 | Cargo Van | Select | | | 59 | GO | GO | 09.06.00 | 09.06.00 |
| ☐ | 1FDDE14N9GHA70067 | xyz-543 | 0 | Active | 1986 | FORD | ECONOLINE E150 | Incomplete Chasis | Silver | 200000 | 200 | 51 | GO | GO | 08.28.00 | 09.05.00 |
| ☐ | 1ZVPT21U5L5204428 | C-2222 | 0 | Active | 1990 | FORD | PROBE LX | Hatchback 2 DR | Maroon | | | 53 | GO | GO | 08.30.00 | 08.30.00 |
| ☐ | 1ZVPT22LXM5132570 | | 0 | Active | 1991 | FORD | PROBE GT | Hatchback 2 DR | Select | | | 53 | GO | GO | 08.30.00 | 08.30.00 |
| ☐ | 2FAPP36X0LB218819 | | 0 | Active | 1990 | FORD | TEMPO GL | Sedan 4 DR | Select | | | 53 | GO | GO | 08.30.00 | 08.30.00 |
| ☐ | 1ZVPT20C1L5120728 | | 0 | Active | 1990 | FORD | PROBE GL | Hatchback 2 DR | Select | | | 53 | GO | GO | 08.30.00 | 08.30.00 |
| ☐ | JHMBA4232KC056199 | | 0 | Active | 1989 | HONDA | PRELUDE 2.0SI/S | Coupe | Select | | | 53 | GO | GO | 08.30.00 | 08.30.00 |
| ☐ | JHMED8350JS006773 | | 0 | Active | 1988 | HONDA | CIVIC CRX DX | Hatchback 2 DR | Select | | | 53 | GO | GO | 08.31.00 | 08.31.00 |
| ☐ | 1J4GZ5854PC115808 | | 0 | Active | 1993 | JEEP | GRAND CHEROKEE LAREDO | 4 Dr. Wagon/Sport Utility | Select | | | 59 | GO | GO | 09.05.00 | 09.05.00 |

[Update]

Sort list by: Status | VIN | Make | Date Added

Page 1 | 2

FIG. 6

Order Reports Now
Turn any used car into a
Carfax Certified Car.
Order Carfax Reports
to check as you shop!

Customer Story
"I checked out the 1996
firebird I was buying. It
was a really good deal but
I wanted to make sure it
wasn't "too good to be
true." The car came up
clean as a whistle. This
was the best twenty bucks
I have ever spent. Thanks
for the peace of mind."

Read More Stories

Find A Dealer
Get a list of Carfax Certified
Dealers near you.

Carfax Certified Cars™

Complete the items below to narrow your search:

Zip Code:   22030
Make:       Ford
Model:      [All models ▼]
Distance:   [Any distance ▼]
Year:       [Any year ▼] to [Any year ▼]

[Search]

Carfax Certified Cars™

Order Reports Now
Turn any used car into a Carfax Certified Car.
Order Carfax Reports to check as you shop!

Customer Story
"Thank you very much Carfax. I am entering my freshman year of college and buying my first car. I was a bit leery of buying it because it was from a used car dealer. After I looked it up on Carfax.com I could finally say I was getting a good deal. Thanks Again!"

Don Chaput

Read More Stories

Find A Dealer
Get a list of Carfax Certified Dealers near you.

Search Results: 1,578 used cars match your criteria. Below are the first 100 matches.
Click on a vehicle to view more details.

Page 1 | 2 | 3 | 4

| Year | Make | Model | Dealer | Distance |
|------|------|-------|--------|----------|
| 1995 | Acura | Legend | Koons Acura | 2 mi. |
| 1996 | Acura | Legend | Smith Acura | 5 mi. |
| 1996 | Acura | Legend | Acura of Fairfax | 7 mi. |
| 1997 | Acura | Legend | Koons Acura | 7 mi. |
| 1992 | Acura | Legend | Jones Acura | 7 mi. |
| 1993 | Acura | Legend | Acura of Arlington | 5 mi. |
| 1994 | Acura | Legend | Acura of Springfield | 3 mi. |
| 1996 | Acura | Legend | Bill's Acura | 2 mi. |
| 1997 | Acura | Legend | Mt. Vernon Acura | 5 mi. |
| 1998 | Acura | Legend | Koons Acura | 5 mi. |
| 1992 | Acura | Legend | Koons Acura | 6 mi. |
| 1991 | Acura | Legend | Koons Acura | 5 mi. |
| 1998 | Acura | Legend | Koons Acura | 5 mi. |
| 1992 | Acura | Legend | Koons Acura | 6 mi. |
| 1991 | Acura | Legend | Koons Acura | 5 mi. |

Page 1 | 2 | 3 | 4

Still looking? Try a new search.

New Search

FIG. 12

⊘Carfax Certified Cars™

Search Results: 20 used cars match your criteria.

Click on a vehicle below to view more details.

Page 1 | 2

| Year | Make | Model | Carfax Certified Dealer | Distance |
|------|------|-------|-------------------------|----------|
| 1996 | Ford | Taurus | Koons Ford | 2 mi. |
| 1996 | Ford | Taurus | Smith Ford | 5 mi. |
| 1998 | Ford | Taurus | Ford of Fairfax | 7 mi. |
| 1997 | Ford | Taurus | Koons Ford | 7 mi. |
| 1998 | Ford | Taurus | Jones Ford | 7 mi. |
| 1996 | Ford | Taurus | Koons Ford | 2 mi. |
| 1996 | Ford | Taurus | Smith Ford | 5 mi. |
| 1998 | Ford | Taurus | Ford of Fairfax | 7 mi. |
| 1997 | Ford | Taurus | Koons Ford | 7 mi. |
| 1997 | Ford | Taurus | Jones Ford | 7 mi. |
| 1998 | Ford | Taurus | Jones Ford | 7 mi. |
| 1996 | Ford | Taurus | Koons Ford | 2 mi. |
| 1996 | Ford | Taurus | Smith Ford | 5 mi. |
| 1998 | Ford | Taurus | Ford of Fairfax | 7 mi. |
| 1997 | Ford | Taurus | Koons Ford | 7 mi. |

Page 1 | 2

Still looking? Try a new search.

[New Search]

Order Reports Now
Turn any used car into a Carfax Certified Car.
Order Carfax Reports to check as you shop!

Customer Story
"I was interested in a 1996 Lexus LS400 which was $2,000 less than KBB. I left the dealership thinking that if that was really what it is, then that should be a fantastic buy. After I researched the car through Carfax, I went back and bought the car. Thanks for the reassurance."
J.G.
Read More Stories

Find A Dealer
Get a list of Carfax Certified Dealers near you.

FIG. 14

![CARFAX Vehicle History Reports]

Get The REAL History of Any Used Car.

FREE! Instant Lemon Check    Enter Your VIN    Zip    GO

About Carfax | Order Reports | Sample Reports | Find A Dealer | Help Center | Account Holders

Order Reports Now
Turn any used car into a Carfax Certified Car.
Order Carfax Reports to check as you shop.

Customer Story
"Since I received your report, I have been more confident in my decision to purchase a used car. It was one more piece of the "used car history" picture. I showed the car to my mechanic and he saw that it did not have any damage, just as Carfax had reported. He took good care of Carfax, but I did share with him... Hopefully he will spread the word!"
Gayle Cho
Read More Stories

Find A Dealer
Get a list of Carfax Certified Dealers near you.

View Another Car | New Search

Carfax Certified Cars™

Print page
Take this page to the dealer

This 1996 Acura Legend is a Carfax Certified Car™ with a guaranteed clean title history as of 8/14/2000. View the full Carfax Report for more details.

1. Vehicle Information

1996 Acura Legend
Vehicle ID #:   3WRC81H9SM043203
Sales Price :   $10,200
Mileage:        72,000
Color:          Red
Body Style:     4DR Sedan
Engine:         2.3 L FI DOHC 16V
Driveline:      Rear-Wheel Drive
Stock Number: A-1234567

View Full Carfax Report

Vehicle Features:
Air conditioning; Power steering; Power brakes; Power windows; Tilt wheel; Anti-theft system; Power sunroof; AM/FM Cass. (CD opt.); 5-speed; Dual airbags; Daytime lights; Anti-theft system

2. Carfax Certified Dealer Information

Koons Acura
123 Main Street
Fairfax, VA 22030
(703) 934-2619
usedcars@koons.com
www.koons.com Map to Dealership Click here to have someone from the dealership to contact you.

3. Next step: Test drive with confidence

Step 1:   Contact the dealer to verify that this car is still in stock.
Step 2:   Print out this page.
Step 3:   Take this printed page to Koons Ford.    Map to Dealership
Step 4:   Visit the dealer to test drive this Carfax Certified Car™

Print page
Take this page to the dealer

View Another Car | New Search

FIG. 15

APPARATUS AND METHOD FOR PERUSING SELECTED VEHICLES HAVING A CLEAN TITLE HISTORY

This application is a continuation of application Ser. No. 10/233,952 filed Sep. 3, 2002 now U.S. Pat. No. 7,228,298, which claims the benefit of Ser. No. 60/316,547, filed Aug. 31, 2001, the contents of these applications being incorporated herein by reference.

BACKGROUND OF THE INVENTION

1. Field of the Invention

The following disclosure relates to apparatus and methods for perusing selected vehicles having a clean title history, and has particular application to apparatus and methods for perusing selected vehicles having a clean title history where the selected vehicles are selected from a database of vehicles containing vehicles for sale from various entities.

2. Description of Related Art

Systems and methods for identifying and displaying discrepancies in vehicle titles have provided consumers with the ability to uncover odometer fraud and/or problems with the selected vehicles. One such method and system is disclosed in U.S. Pat. No. 4,989,144, the disclosure of which is incorporated herein by reference. Such systems have provided benefit to consumers and sellers of cars by providing information concerning discrepancies in vehicle titles and/or assurances that there are no records of such discrepancies, or in other words, that vehicles have a clean title. While such systems and methods have been perfectly adequate for their intended use, they do not provide potential buyers with the opportunity to selectively search a database that includes a large selection of vehicles for sale that have been prescreened and found not to have any discrepancies in the vehicle title. Likewise, such systems did not provide sellers with the opportunity to offer a prescreened vehicle, that does not have any discrepancies in the vehicle title, from one seller along with prescreened vehicles from other sellers in a single searchable database.

SUMMARY OF THE INVENTION

The disclosed apparatus and methods avoid some of the disadvantages of prior devices and methods while affording additional structural and operating advantages. The disclosed apparatus and method for perusing selected vehicles having a clean title comprises certain novel features and a combination of parts hereinafter fully described and illustrated in the accompanying drawings, it being understood that various changes in the details may be made without departing from the spirit, or sacrificing any of the advantages of the present disclosed apparatus and method for perusing selected vehicles having a clean title history.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 3 is a display used with the subsystem of FIG. 2;

FIG. 4 is a printed version of the display of FIG. 3;

FIG. 6 is a display used with the subsystem of FIG. 5;

FIG. 9 is a second display used with the subsystem of FIG. 7;

FIG. 10 is an alternate second display used with the subsystem of FIG. 7;

FIG. 12 is a fourth display of the search results found using the subsystem of FIG. 7;

FIG. 14 is a display of search results using the subsystem of FIG. 13;

FIG. 15 is a display of vehicle information concerning one car in the results of FIG. 14.

DETAILED DESCRIPTION OF THE PREFERRED EMBODIMENT

Figure 1:
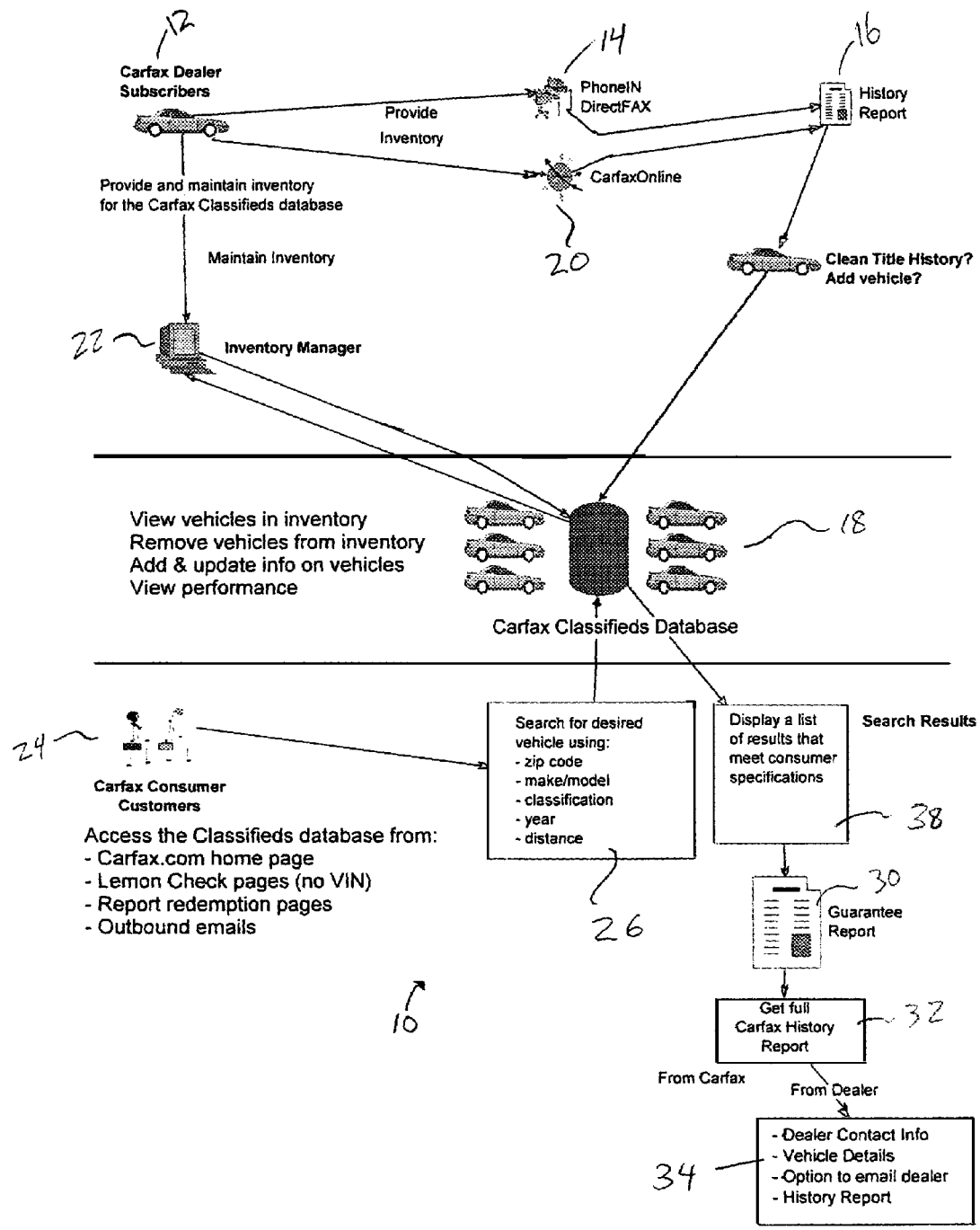
FIG. 1 is a schematic diagram of a system for perusing selected vehicles having a clean title history.

Turning now to the drawings, and more particularly, to FIG. 1 thereof, there is depicted a system for perusing selected vehicles having a clean title history 10. The system involves a plurality of car sellers, such as dealer subscribers 12 that use system 10 as one way to get their inventory of vehicles having no known title defects in front of a large customer base. Dealer subscribers 12 can be located at a variety of remote locations throughout the U.S. The dealer subscriber provides details about cars in its inventory for inclusion in a database of vehicles that have no known title defects. In one form, the dealer provides information concerning one or more cars via traditional telephony equipment 14, such as a phone or facsimile, to a service center which takes the information and runs a history report on the vehicle title to determine whether any discrepancies exist in the vehicle title. In one form, the discrepancy may indicate that the existing title is a salvaged title, a previous salvaged title had been issued, or that miles were unknown or not provided at the time of the transaction. Another type of discrepancy is known as a contextual discrepancy and can only be determined by studying and comparing the title transaction history. One example of a system for identifying such discrepancies in vehicle titles is shown in U.S. Pat. No. 4,989,144.

After a history report 16 is run for the subject vehicle, the report can be transmitted back to the dealer subscriber 12 via telephony equipment 14 and dealer subscriber 12 can be given the option of adding the vehicle to a database 18 that contains searchable information concerning cars from a plurality of different car sellers. In one form, the dealer subscriber is only allowed the opportunity to add the vehicle information to database 18 if the vehicle has a clean title history or, in other words, has no known vehicle title discrepancies.

In an alternative form, dealer subscriber 12 can provide vehicle information using the internet, such as through Carfax Online.com, to obtain history report 16 and then, if the vehicle has a clean title, be given an option to add the vehicle to database 18. An inventory manager interface 22 can be provided via the internet, intranet or can be otherwise linked to database 18. The inventory manager interface allows dealer subscriber 12, either directly or through an intermediary, to provide vehicle information to database 18, update vehicle information to database 18 and/or remove vehicle information from database 18 after a vehicle has sold. Inventory manager interface 22 also allows the dealer subscriber 18 to add information or update information concerning a vehicle previously added to database 18.

Car shoppers, such as customers 24 can also access the database of vehicle information through the internet, an intranet, or other network, such as through the internet site Carfax.com. The search program 26 can be accessed by customer 24 through a link on the homepage of the internet site. In one form, search program 26 is designed to allow customer 24 to search the vehicle information in database 18 according to the make or model of the car, the car classification, year of the car, cars within a particular radial distance of a location specified by the customer 24, or within certain zip codes or other area classifications such as cities, states, etc. Examples of car classifications include, SUV's, minivans, vans, trucks, compact trucks, full size trucks, compact cars, midsized cars, sports cars, foreign cars, and domestic cars.

In one form, database 18 can contain information about cars that have been identified as having no known title discrepancies, cars that have title discrepancies, and/or cars where little or no effort was made to determine whether any title discrepancies exist. In that case, search program 26 can allow for a customer 24 to search for, or exclude, any of these three parameters. For example, search program 26 can be designed to allow customer 24 to search for only those cars that have been identified as having no known title discrepancies. Alternatively, customer 24 may seek to merely exclude those cars that have known title discrepancies.

Search results 28 can be displayed on the display (not shown) coupled to the computer used by customer 24 to link to the internet. The customer 24 can then review the list of cars that meet the customers specifications and then view a guaranteed vehicle report, that specifies the particular vehicle information and whether or not a title discrepancy search had been performed and the results of such a search. Additionally, the consumer is given the option to obtain the full history report containing the full title history. In one form, the search results include the dealer contact information, vehicle details, and an option to email the dealer. Alternatively, customer 24 may be given the option to purchase the vehicle or make an offer on the vehicle over the internet by filling out a form on the internet webpage.

The system described with respect to FIG. 1 can be divided into four basic subsystems. These subsystems are collecting inventory, managing and reporting on inventory, searching inventory, and displaying output 34.

Figure 2:
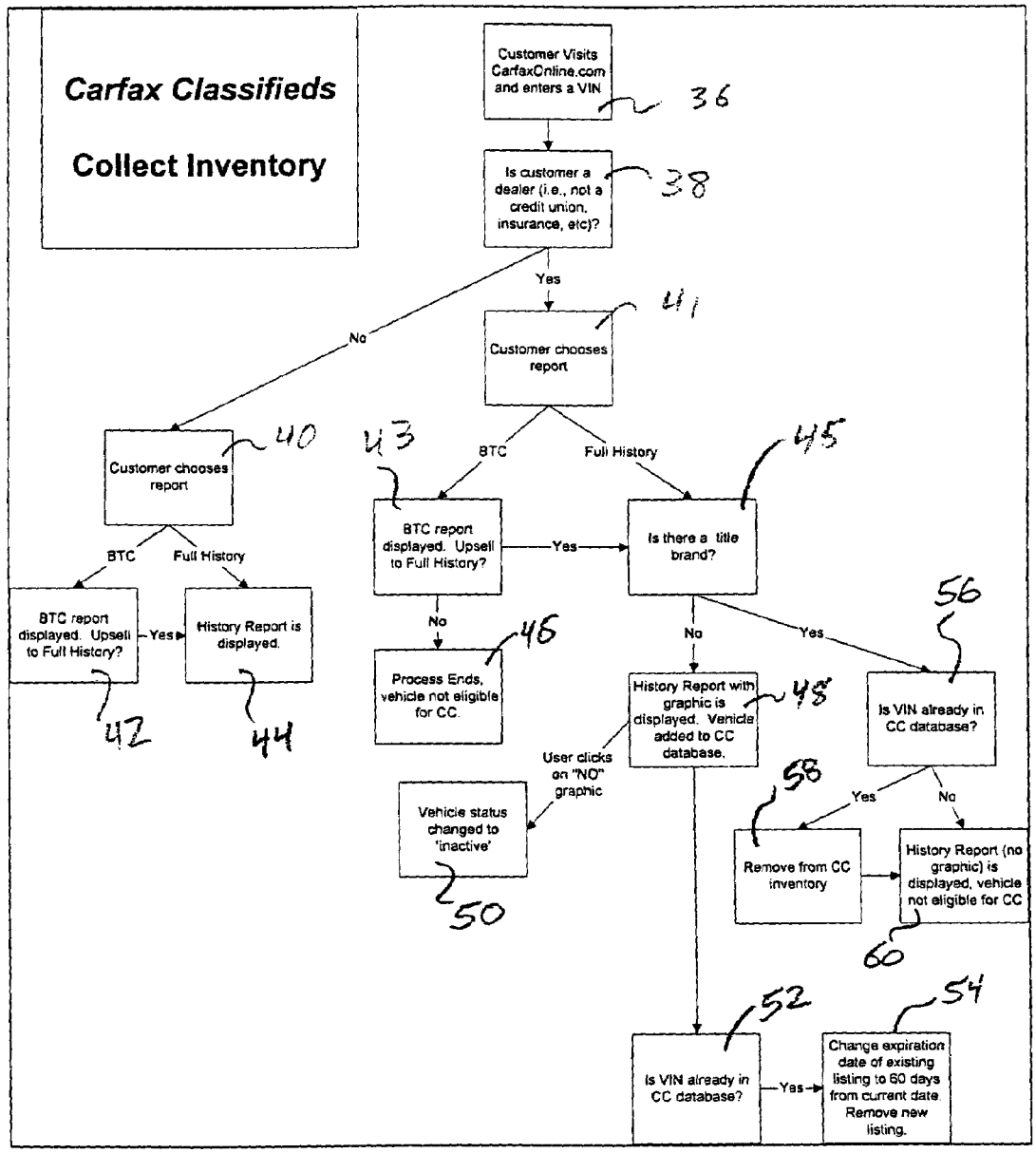
FIG. 2 is a flowchart for a inventory collection subsystem used in the system of FIG. 1.

Referring to FIG. 2, there is shown one form of the process of collecting inventory for database 18. In one form, a car seller visits an internet site that is designed to enable the collection of vehicle information into a database 18. In one form the customer visits www.carfaxonline.com and enters a vehicle identification number (VIN). The customers can be differentiated by their primary business class (PBC), such as new car dealers, used car dealers, mega dealers, insurance companies, loan companies, auto auctions, credit unions, etc. In one form, only certain customers will have the option to add vehicles to inventory 18. In one form, only dealers will have the option to add vehicles to inventory 18 because many other types of customers, for example credit unions, only obtain reports for making decisions on loans and not for selling cars. In another form, any customer may have the option to add vehicles to inventory I8.

In one form, the customer will enter a customer number or other identification number that identifies the customer an its primary business class type. At 38 the system identifies whether a customer is a dealer or not and if the customer is not a dealer, the customer is allowed to choose a report type at 40. The customer can be allowed to choose from among several report types. For example, a customer may be allowed to choose a Carfax branded title check (BTC) report that will show whether or not there is any known discrepancies in the title history, but does not include the history records at 42. The customer can also choose a full history report that includes a full available history of the title and related records at 44. If the customer is of the appropriate business class, the customer chooses the report type such as branded title check 43 or full history 45. Whenever a branded title check report is chosen, the system can display an option to upgrade to a full report history. In one form, if the dealer does not choose full history 45, or does not upgrade to the full history, the process ends at 46 and the vehicle is not eligible for entry into database 18.

If the dealer chooses full history 45, the system checks the vehicle for eligibility for addition to database 18. In one form, the vehicle identification number must have a clean title history, meaning no known specified defects are found in the history report in order to allow the vehicle's addition to database 18. If the vehicle is eligible for inclusion in database 18, then the vehicle information is added to database 18 at 48.

An alternate system is shown in FIG. 3 and includes a graphic in the form of an animated GIF 49 that allows the dealer to opt out of placing the vehicle in inventory 18 instead of opting in. If the dealer clicks on the GIF, the vehicle status is changed to inactive in database 18 at 50. If the dealer does not click on GIF 49, the system determines whether the vehicle identification number is already in database 18 at 52. If the vehicle is already on the database, the expiration date of the existing listing is extended from the current expiration date, such as adding an additional 60 days, and the new listing generated by the history report being run is removed at 54.

If there is a title brand discrepancy or defect in the title found at 45, the subsystem checks to see if the vehicle identification number is already in database 18 at 56. If the vehicle identification number is already in database 18, such as from a previous insertion prior to containing a defect, the vehicle information is removed from database 18 at 58. If the vehicle is not already in the database, the history report that shows the defect, is displayed and the vehicle is not eligible for inclusion in inventory 18. When a vehicle is written to inventory in database 18, a vehicle class is assigned to allow users to search on a broad class basis instead of through only a make/ and model search.

In a rare case, the search results may indicate that an incorrect title brand makes the car ineligible and a hyperlink can be used to offer to rerun the vehicle again for free. In such case, it may be desirable to have the report run manually through customer service to manually double check the results and to determine the exact problem with the discrepancy or incorrect title brand.

An upsell message can used with the display of the basic report to try to encourage users to buy a full history report when they have purchased the branded title check. In one form, a hyperlink is used in the display of the branded title check to make such a purchase. If the displayed history report is printed out, the hyperlink (GIF 49) does not need to appear in the printout. For example, the printed version could take on the form shown in FIG. 4. One of ordinary skill in the art will recognize that many of the other actions described herein can occur using hyperlinks to click through various pages on the Internet.

Figure 5:
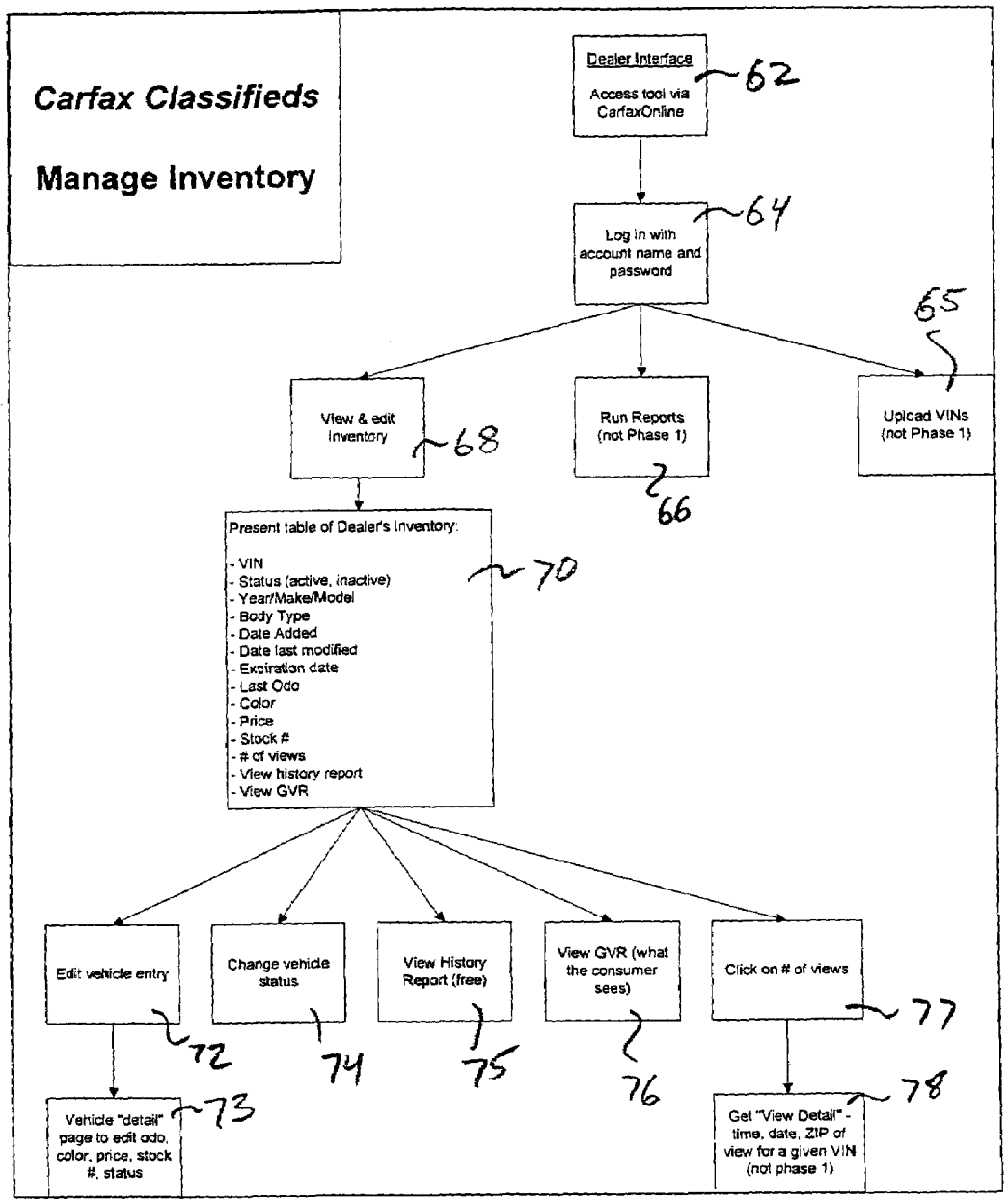
FIG. 5 is a flowchart for an inventory management subsystem used in the system of FIG. 1.

Referring to FIG. 5, there is shown one form of a subsystem in system 10 that allows a dealer, or other seller, to manage the vehicles they entered into database 18. In one form, an internet-based interface allows the dealer to perform tasks such as viewing a list of the dealer's vehicles that are currently in the inventory of database 18, deleting the dealer's vehicles that have sold, updating information about vehicles in the inventory of database 18, viewing performance criteria and generating reports. Additionally, the system allows for rules to be established internally for purging vehicles from the database and generating reports to be used externally.

The car seller accesses the system through a web-based interface, such as through www.carfaxonline.com at 62. The seller has to log in with an account name and password so that the inventory manager program is accessible only to those with the appropriate accounts at 64. The subsystem allows dealers to upload vehicle information for additional cars by uploading the vehicle identification numbers at 65 and continuing in a manner similar to that shown in FIG. 2.

After the seller has logged in, the system displays all vehicles the seller has entered into the inventory of database 18 and can display a variety of information concerning such vehicles. Examples of such information include the VIN number, the status (such as active, inactive, or removed), year, make, model, body type, date added to inventory, date last modified, number of active days left in database 18, the odometer reading supplied by the dealer, the color supplied by the dealer, the price supplied by the dealer, the stock number supplied by the dealer, a vehicle history report icon that is hyperlinked to the history report, a guaranteed vehicle report (GVR, discussed below) icon, the number of consumers who have viewed information concerning the car, and the number of times the car was found in a search.

The seller can view and edit the inventory at 68 and the system will present a table of the dealer's inventory information at 70. The dealer can edit vehicle information at 72 by clicking on a hyperlink that brings up detailed vehicle history. Clicking the hyperlink also allows the dealer to access a form having various fields that enables them to edit the odometer reading, the color, the price, the stock number, the status, etc. at 73. The system also lets the dealer change the vehicle status at 74, view the history report at 75, view the GVR, which is what the consumer sees at 76. The dealer can click on any of the numbers concerning consumer views to get additional view details that includes time, date, zip code information of the vehicles that were viewed for any given vehicle identification number at 77 and 78.

In one form, the dealer can click on a hyperlink that will bring up a summary form of various information fields and allows the dealer to edit selected fields for each vehicle, such as the status, odometer reading, the color, the price, and the stock number. The system can be designed to automatically store active vehicles for a set period of time from the date of the last history report, at which point it will become inactive. The vehicle then remains on an inactive list for another set period of time and can be reactivated by obtaining a new vehicle history report. After the set period of time on the inactive list, the vehicle is moved to an archive database. For example, the vehicle may remain active for 60 days and on the inactive list for 30 days before being archived. However, theses time periods may be adjusted.

The management system can also provide a summary listing of the number of times a particular vehicle was viewed or included in a search and the total number of separate times customers have viewed any vehicle in the dealer's inventory for a particular time period. In one form, the system can tell the number of actual times the potential customer has clicked on information concerning a particular car. Alternatively, the number of views can be defined as the number of times the vehicle was found in a search even if the potential buyer did not click on the hyperlink relating to that vehicle in order to view additional information.

The information provided concerning the dealer's inventory can be sorted by status (such as active, inactive, etc.) and then by make. In one form, the information that the dealer enters concerning new inventory is exported into standard data files, such as CSB or XLS files. By putting the information in spreadsheet cell type forms, it allows the dealer the ability to sort the information according to the information found in the different columns, such as make, model, year, price, etc. In one form, the sortable table of the dealer's inventory 70 can be similar to that shown in FIG. 6. The system can include the ability to add a secondary and tertiary sorts. The system can allow the dealer to view the history report for each vehicle entered into the inventory for free, since he already ran the report.

In one form, if a vehicle is already in the database and is rerun by the dealer, and it now has a branded title, the vehicle is removed from inventory 18. As new information is included in the system that runs the vehicle report, the contents of database 18 can be continuously checked and the status of affected vehicles can be changed. Additionally, the dealer can have the ability to view what the consumer sees concerning the vehicle, such as the guaranteed vehicle report (GVR) which gives vehicle information and the assurance that no known vehicle discrepancy has been found. In one form, the GVR may take the form of FIG. 4.

A printer friendly version of fields to upload vehicle information can be made to allow the dealer to print the version and fill out the report by hand and fax into a customer service center that runs the report and, if appropriate, adds the vehicle to database 18. The inventory management system of FIG. 5 can be set up to allow access for account managers so that they have the ability to log in with their own password and enter different location id's to see various dealer's inventories.

Figure 7:
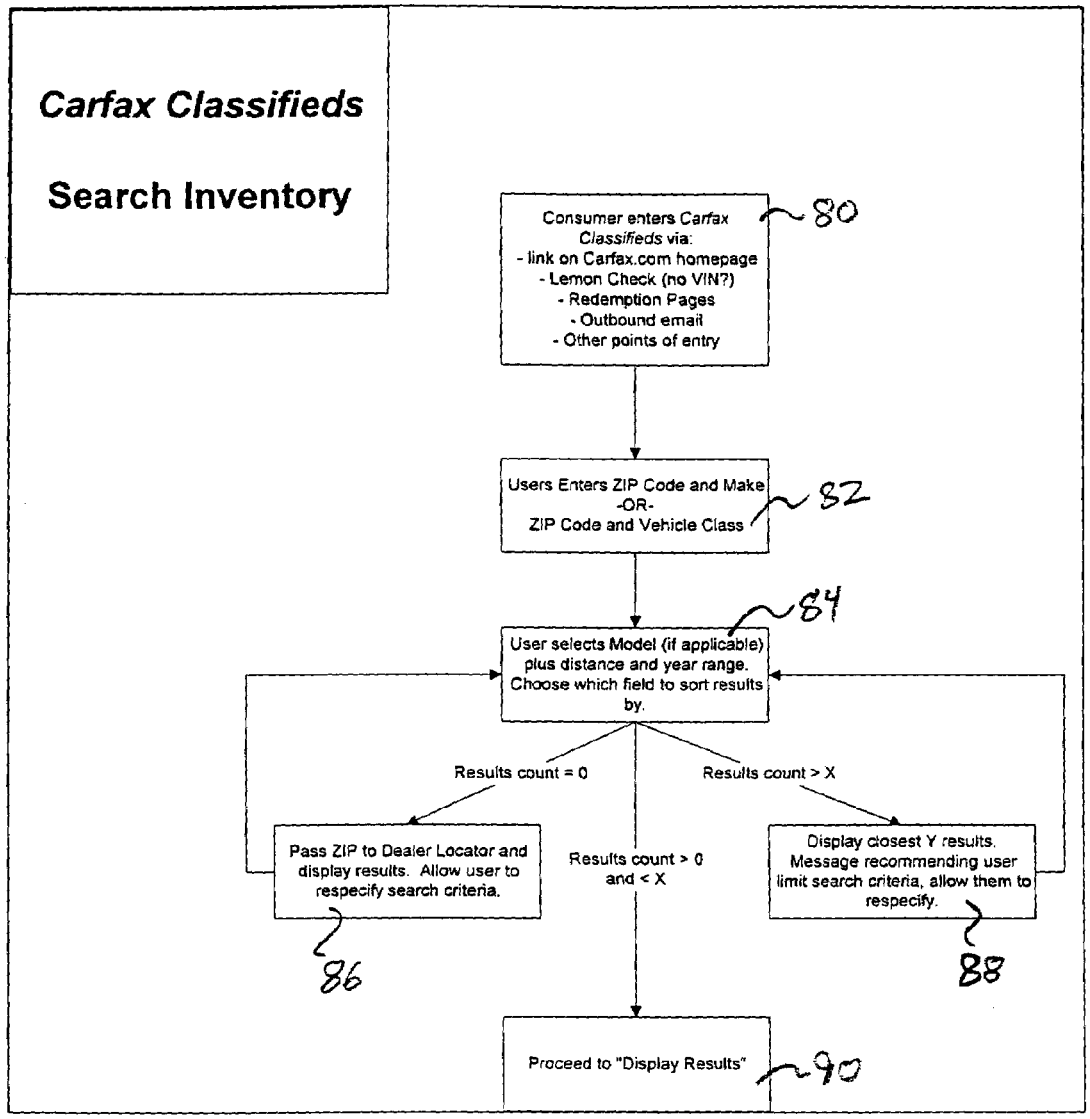
FIG. 7 is a flowchart of an inventory search subsystem used in the system of FIG. 1.
Figure 8:
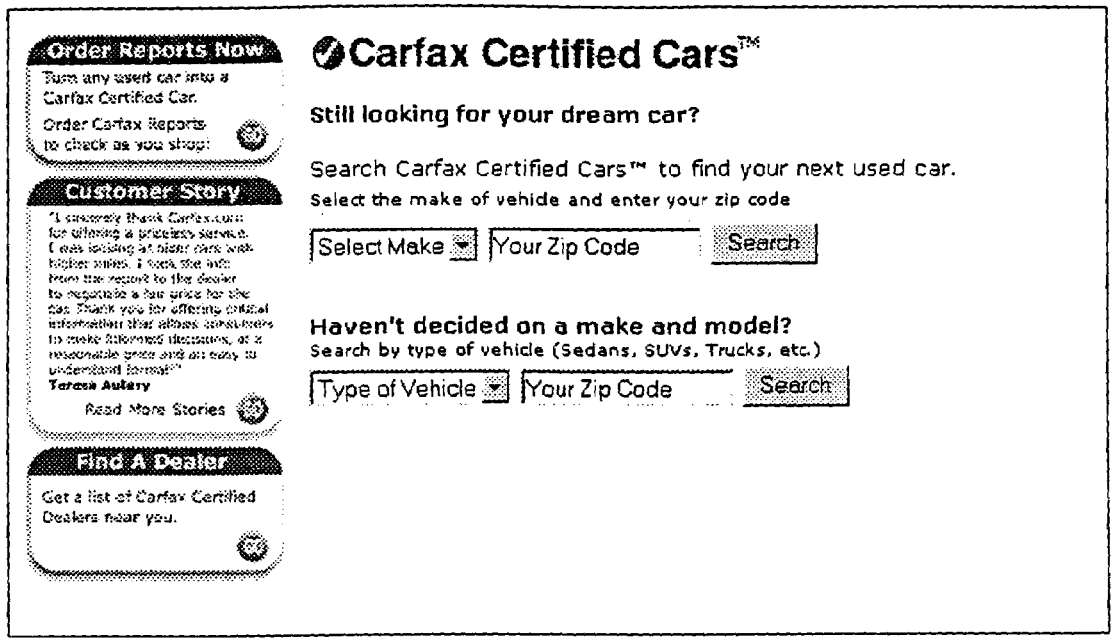
FIG. 8 is a display used with the subsystem of FIG. 7.
Figure 10:
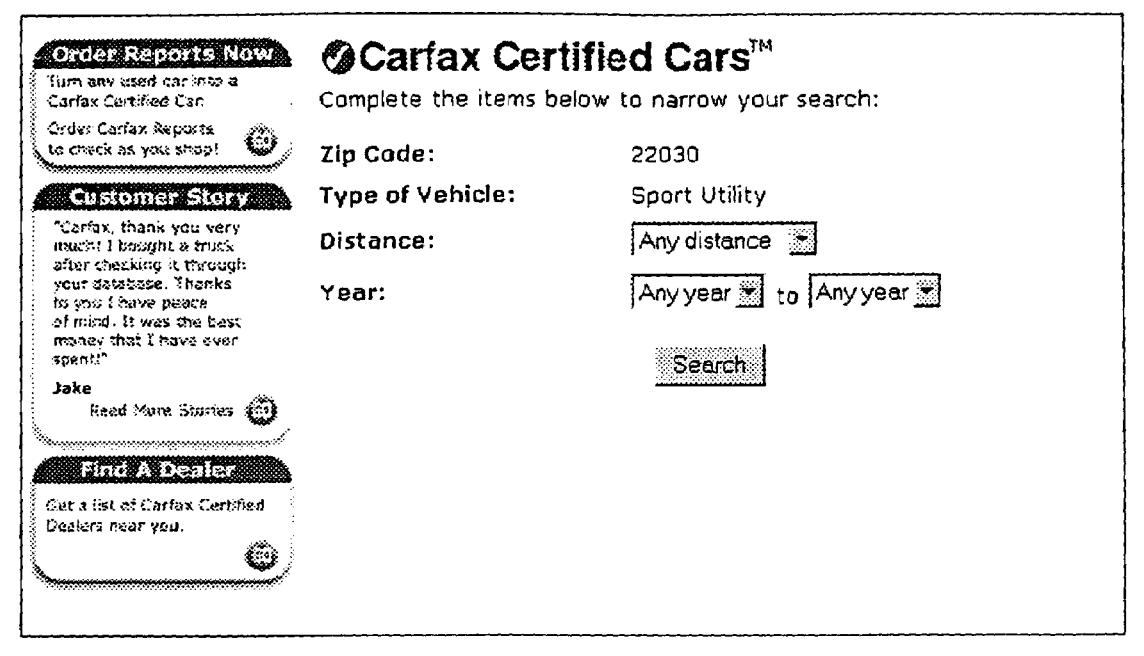

Referring to FIG. 7, there is shown a subsystem of system 10 for searching the inventory of database 11. This is the entry point for potential customers, where they can specify their search criteria such as make/model, zip code, area where the vehicle is located, vehicle class, distance to their location, etc. The potential customer accesses the search inventory subsystem via the internet, such as via the carfax.com home page on another point of entry at 80. The potential customer enters a search criteria at 82, such as by using the search page shown in FIG. 8. Then the consumer can be allowed to select from additional criteria at 84 to further narrow the search results, such as by using the search page shown in FIG. 9 or the one shown in FIG. 10.

Figure 11:
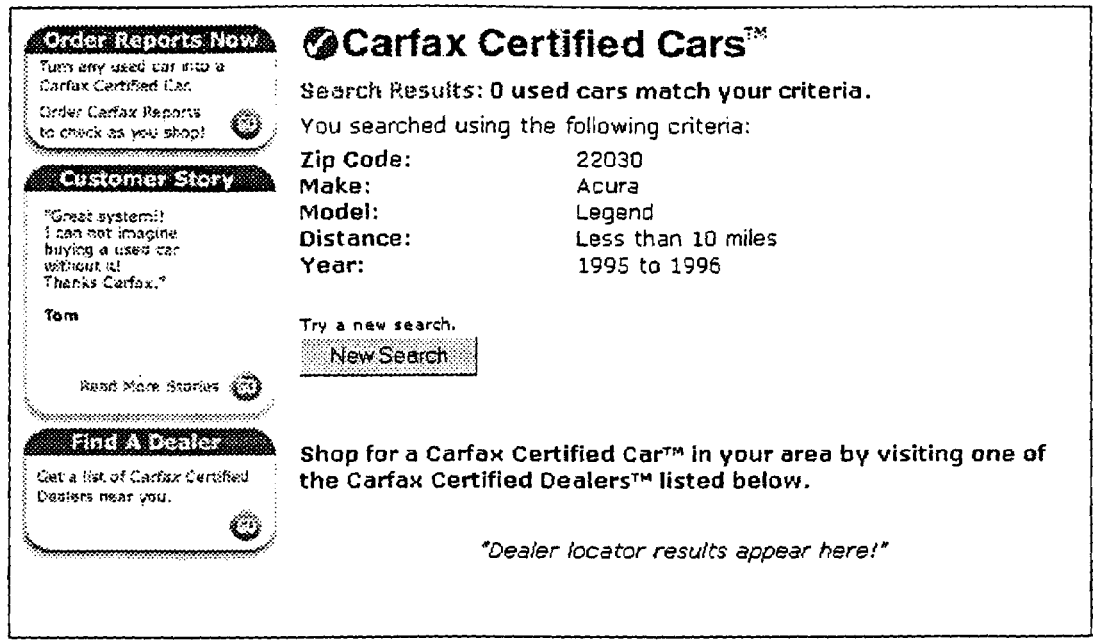
FIG. 11 is a third display used with the subsystem of FIG. 7.

If no cars are found in the search results, the next webpage shows that no vehicles matched the criteria and gives a list of participating nearby dealers for the consumer along with the option to select a new search, as shown in FIG. 11. If the number of cars that match the criteria is greater than a set number, a subset of the matched vehicles are displayed and a message recommends the user to further limit the search criteria at 88, as shown in FIG. 12. If the results are greater than zero but less than the set number described above, the system displays the results at 90.

Figure 13:
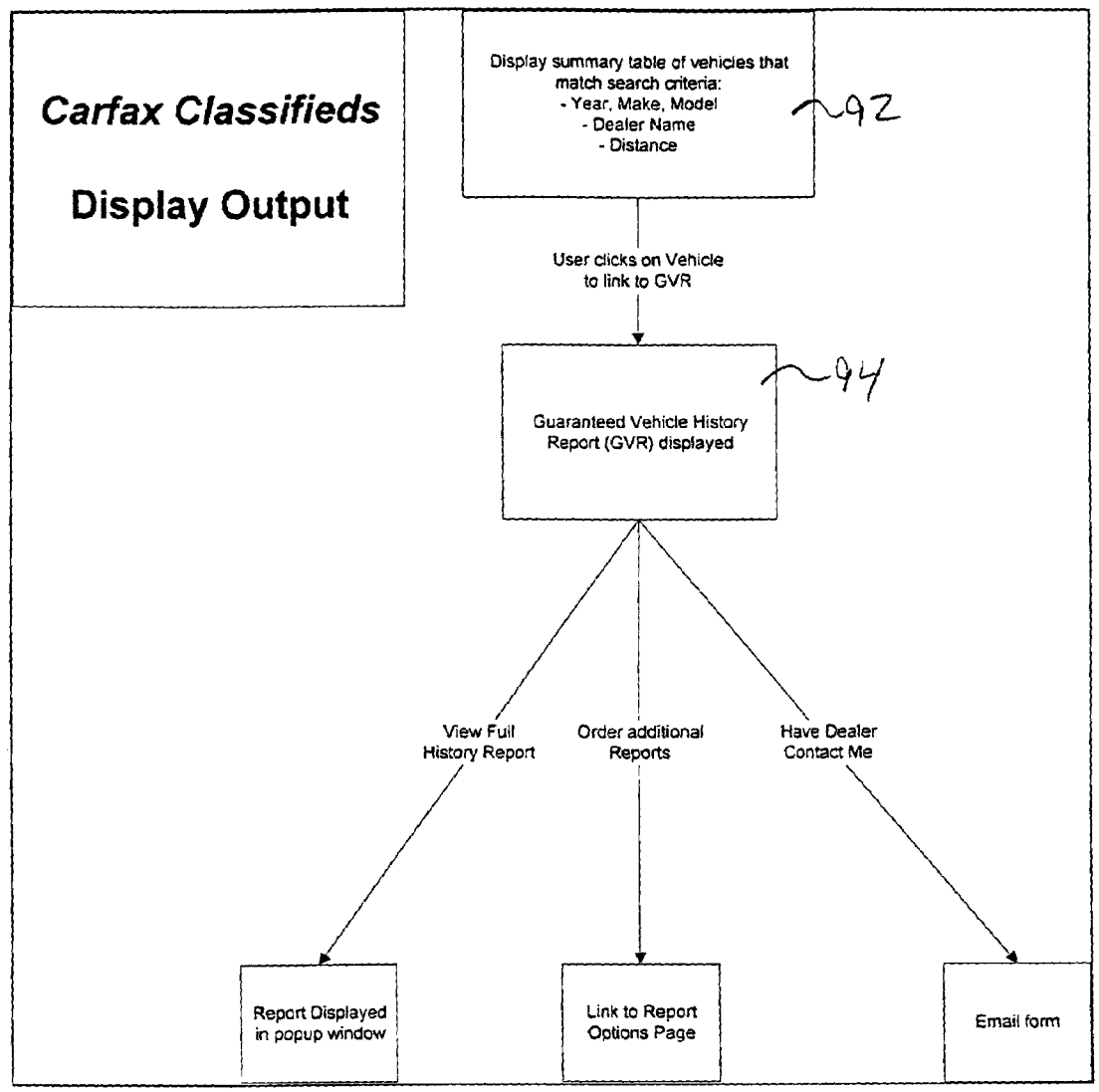
FIG. 13 is a flowchart of a output display subsystem used in the system of FIG. 1.

Referring to FIG. 13, there is shown a display output subroutine that is part of system 10. This subroutine controls the information that is provided to the potential car buyer and allows them the opportunity to purchase a vehicle report and visit the dealer's website or e-mail the dealer regarding a vehicle listed in the search results. In one form, the display output is a summary table of vehicles that match the potential buyer's search criteria, such as the year, make, model, dealer name and distance from the potential buyer. An example of such a summary table is shown in FIG. 14.

The make, model, and dealer information can be displayed using hyperlinks to allow the consumer to click on the hyperlink to access a page containing additional information concerning the selected item. Such hyperlinks can also be used to display additional details concerning a particular vehicle found in the search results. The information can be sorted in a variety of ways and can have a default sort, for example, by distance to the potential car buyer. Like the seller, the buyer can click on the different column headings to re-sort the displayed vehicles so that they are sorted by the criteria of the selected column heading. In one example, if the column heading "make" is selected, then the cards are sorted by make. Likewise, if the "model" column is selected, then the results are sorted according to particular models. If the number of vehicles found in the search are greater than the maximum number displayed on each page, hyperlinks are displayed for additional pages and the user can click on the vehicle hyperlink to view the guaranteed vehicle report at 94. In one form, the user is given the option to compare the vehicles on the same page so that three guaranteed vehicle history reports are displayed on the same page. The reports can be displayed in a popup window and the user can be given the option to order additional reports or have a dealer contact them by clicking on appropriate items on the webpage.

For each vehicle that is in the search results, the system increments a counter for that vehicle identification number. This enables the inventory manager subroutine to provide information to the dealer concerning the number of times that their vehicle has been included in a list of cars searched by a potential customer. In one form, if the number of vehicles in the search result is greater than a set number and only a portion of the results are displayed, then the counters are incremented only for the vehicles that are displayed, and not for the other vehicles that match the criteria.

The guaranteed vehicle history report that is displayed at 94, after the potential buyer has clicked on a particular hyperlink for a vehicle, can be similar to the one shown in FIG. 15. The guaranteed vehicle history report can be composed of various sections, including a vehicle description or information section that is based, at least in part, on data related to the vehicle identification number. Additional information that is provided by the dealer can be shown such as odometer reading, color, price, stock number, etc. A dealer information section can also be provided to include, for example, the dealer name, address, phone, web, e-mail, and a map to the dealer. In some cases, a hyperlink can be used to display the information on a different page or to allow the potential customer to go directly to the dealer's website, or e-mail the dealer. In one form, a hyperlink is used to go to a form for requesting that the dealer contact the potential car buyer.

A hyperlink can allow the potential car buyer to view a full vehicle title report. In one form, the hyperlink for viewing the full vehicle title report may require the payment of a fee. The fee can be paid by credit card, paypal, a checking account number, or any other suitable method.

If the potential car buyer clicks on a specific vehicle to view the guaranteed vehicle history report, the click through can be tracked to allow that information to be displayed to the dealer using the inventory manager subsystem. Additionally, other click-throughs can be tracked so that the number of click-throughs to the dealer's website, the dealer's e-mail, the map to the dealership, or the request to have someone contact the potential buyer can be tracked. The system can track the specific guaranteed vehicle history reports that are printed by using a print button to initiate the count. In one form, the referral e-mail format follows auto lead data format (ADF) established by COBOL. Information concerning this format is available at htpp:\\www.cobolgroup.com\adf\.

Figure 16:
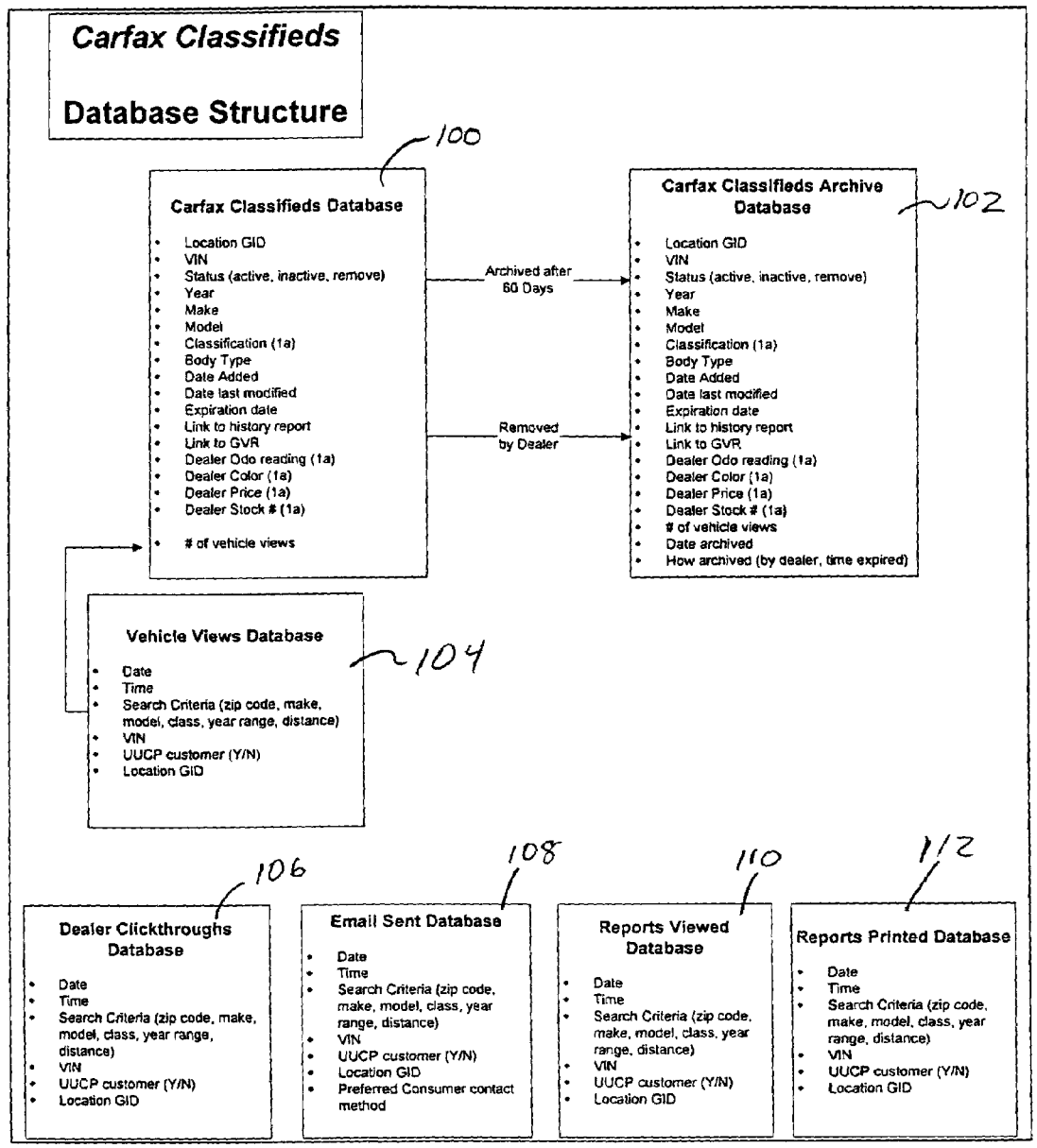
FIG. 16 is a schematic diagram of the database structure used in the system of FIG. 1.

Referring to FIG. 16, there is shown one form of a database structure that is used with the previously discussed subroutines for system 10. This database focuses on inventory collection and the managing and reporting on the inventory collection. The database shown in FIG. 16 comprises a variety of sub-databases to allow for easier collection and sorting of information.

One sub-database can include cars currently in database 18. This allows the inventory to be kept separate from other information and can make it easier to edit the vehicle information and add to the vehicle information. It also is used to separate information that the dealers can edit from information contained in other databases that the dealers are not permitted to edit.

The vehicle information's sub-database 100 can include a geographical location ID (location GID) for each dealer, the vehicle identification number, the status of the vehicle (active, inactive, remove) the year, the make, the model, the classification, the body type, the date added, the date last modified, the expiration date, the link to the full vehicle title history report, the link to the guaranteed vehicle report, the dealer provided odometer reading, the dealer provided color, the dealer provided price, the dealer provided stock number, and/or one or more views of the vehicle. The vehicles contained in sub-database 100 can be transferred to an archival database 102 after a set period of time or after removal by the vehicle seller using the management tool. This archive database provides a way of storing inventory activity by each dealer in a separate, off-line database which can then be used for archival and analysis purposes.

In one form, a procedure runs which places a vehicle in archived database 102 if it has been in the active database 100 as an active vehicle for a set period of time and inactive for a second set period of time, or if the dealer changes the vehicle status to remove it. For example, a vehicle is maintained in the active database 100 as an active vehicle for 60 days and 30 days as an inactive vehicle before it is automatically removed to archived database 102. Database 102 is very similar to active database 100. In one form, archived database 102 cannot be edited by potential car sellers and contains the same type of information contained in active database 100. The archived database can also include information concerning the date each vehicle was archived and how it was archived, such as through the expiration of a set period of time or by the dealer's involvement.

A dealer view subdatabase or vehicle view database 104 is provided to detail each time a dealer's vehicle is displayed as a result of a potential buyer's search query. A record is written in this database for each vehicle that is displayed for each dealer. The sum of this vehicle listing can appear as a number under the number of consumer views in the inventory manager subroutine discussed previously. In one form, the views number is updated on a daily basis.

Database 104 can contain the date and time each search occurred along with the search criteria, the vehicle identification number and any other pertinent information. In one form, database 104 will also include whether or not the potential customer was an unlimited usage car information purchase customer (UUCP customer) for a system that allows the customer to perform unlimited views of full title history reports for a set period of time. The database can also include the geographical location identifier (GID) and any other ID that specifically identifies the dealer associated with a particular vehicle identification number.

A dealer click through database 106 can be provided to track the number of click throughs that system 10 generates for a car seller. In one form, on the guaranteed vehicle report, one or more fields are presented that contain the URL for the dealer's website or a hyperlink for other information. Each time a consumer clicks on the URL for the dealer's website, a record is written to the dealer click through database 106. Such record can contain the same types of information discussed with respect to database 104.

An e-mail sent database 108 can also be provided to track the number of consumer e-mails that system 10 is generating for the car sellers. In one form, consumers who chose to obtain the history report from a dealer will have the option to send an e-mail to the dealer requesting the history report and/or more information. Each time a potential buyer uses system 10 to send an e-mail to a dealer, a record is written to the database. Such record can contain the same types of information discussed with respect to database 104, along with information concerning the potential buyer's preferred method of having the dealer contact them.

A report's viewed database 110 can be used to track the number of times a guaranteed vehicle report is viewed by a user for a particular vehicle. Each time the user clicks on a particular vehicle found in its search, a record is written to database 110. Such record can contain the same types of information discussed with respect to database 104. Similarly, a report's printed database 112 can be used to track the number of users who choose to obtain the full vehicle title history report from a dealer by printing out the guaranteed vehicle report and taking it to the dealer for a free full vehicle title history report. In one form, this can be implemented using a print button on the report, which would simply call the browser's print function, but would also add a record to the database. Such record can contain the same types of information discussed with respect to database 104.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

I claim:

1. A computer-based used vehicle system for perusing and searching used vehicles comprising:
    an inventory collection subsystem adapted to allow an authorized subscriber to submit vehicle identification numbers corresponding to a plurality of vehicles;
    a vehicle history management subsystem that analyzes said submitted vehicle identification numbers to determine whether vehicle histories of each of said plurality of vehicles have a predetermined discrepancy;
    a classifieds database that stores vehicle information regarding at least a portion of said plurality of vehicles analyzed by said vehicle history management subsystem;
    a search subsystem having a search program adapted to allow remote searching of said classifieds database for vehicles based on search query criteria that includes whether said predetermined discrepancy exists; and
    a display subsystem that displays a listing of vehicles in said classifieds database identified as satisfying said search query criteria by said search subsystem;
    wherein said search program is adapted to allow exclusion of vehicles from said listing that are determined to have said predetermined discrepancy.

2. The used vehicle system of claim 1, further comprising an inventory manager subsystem that allows the authorized subscriber to modify vehicle information regarding at least one vehicle of said classifieds database.

3. The used vehicle system of claim 1, wherein said vehicle history management subsystem includes a vehicle history information database having vehicle history records, each vehicle history record relating to a particular vehicle and being associated with a vehicle identification number of said particular vehicle.

4. A computer-implemented method for perusing and searching used vehicles comprising:
    submitting a plurality of vehicle identification numbers corresponding to a plurality of vehicles;
    analyzing said vehicle identification numbers to determine whether vehicle histories of each of said plurality of vehicles have a predetermined discrepancy;
    providing a classifieds database that stores vehicle information regarding at least a portion of said plurality of vehicles analyzed;
    remotely searching said classifieds database for vehicles based on search query criteria that includes whether said predetermined discrepancy exists;
    displaying a listing of vehicles in said classifieds database identified as satisfying said search query criteria; and
    excluding vehicles from said listing that are determined to have said predetermined discrepancy.

5. The method of claim 4, further including providing a vehicle history information database having vehicle history records for said plurality of vehicles, each vehicle history record relating to a particular vehicle and being associated with a vehicle identification number of said particular vehicle, and wherein said analysis of vehicle identification numbers include analyzing said vehicle history records of said vehicle history information database.

6. A computer-based used vehicle system for perusing and searching used vehicles comprising:
    a vehicle history information database having vehicle history records, each vehicle history record relating to a particular vehicle and being associated with a vehicle identification number of said particular vehicle;
    a vehicle history management subsystem that analyzes vehicle history records from said vehicle history information database to determine whether vehicle histories of each of said plurality of vehicles have a predetermined discrepancy; and
    a search subsystem having a search program adapted to allow remote searching for vehicles based on a search query criteria received from a user, the search query criteria including whether said predetermined discrepancy exists;
    wherein said search program allows exclusion of vehicles which are determined to have said predetermined discrepancy from a search result.

7. The used vehicle system of claim 6, wherein said predetermined discrepancy is at least one of a branded title, unknown mileage, and contextual discrepancy determined based on title.

8. The used vehicle system of claim 6, wherein said predetermined discrepancy is a branded title.

9. The used vehicle system of claim 6, further including a display subsystem that displays a listing of vehicles in said classifieds database identified as satisfying said search query criteria by said search subsystem.

10. The used vehicle system of claim 9, wherein said display subsystem further displays a communication link that allows the consumers to generate a message regarding a selected vehicle addressed to a seller of the selected vehicle.

11. The used vehicle system of claim 6, further including a classifieds database that stores vehicle information regarding at least a portion of said plurality of vehicles analyzed by said vehicle history management subsystem for which said predetermined discrepancy does not exist.

12. The used vehicle system of claim 6, wherein said search query criteria further includes location, make of the vehicle, model of the vehicle, and year of the vehicle.

13. A computer-implemented method for perusing and searching used vehicles comprising:

providing a vehicle history information database having vehicle history records for a plurality of vehicles;

analyzing said vehicle history records to determine whether vehicle histories of each of said plurality of vehicles have a predetermined discrepancy;

providing a classifieds database that stores vehicle information regarding at least a portion of said plurality of vehicles analyzed;

remotely submitting a search query criteria that excludes vehicles analyzed to have the predetermined discrepancy; and searching said classifieds database for vehicles based on search query criteria to identify vehicles that satisfies said search query criteria that excludes vehicles analyzed to have the predetermined discrepancy.

14. The method of claim 13, wherein said predetermined discrepancy is at least one of a branded title, unknown mileage, and contextual discrepancy determined based on title.

15. The method of claim 13, wherein said predetermined discrepancy is a branded title.

16. The method of claim 13, wherein said search criteria further includes location, make of the vehicle, model of the vehicle, and year of the vehicle.

17. The method of claim 13, further including displaying a listing of vehicles in said classifieds database identified as satisfying said search query criteria.

18. The method of claim 13, wherein each vehicle history record relates to a particular vehicle and is associated with a vehicle identification number of said particular vehicle.

19. The method of claim 13, wherein said classifieds database stores vehicle information for vehicles that are determined to have clean titles.

20. The method of claim 13, further including generating a communication link that allows generating of a message regarding a selected vehicle addressed to a seller of the selected vehicle.

* * * * *